United States Patent [19]
Kim

[11] Patent Number: 5,867,007
[45] Date of Patent: Feb. 2, 1999

[54] SELECTION CIRCUIT FOR DUAL BATTERIES IN A BATTERY POWERED ELECTRONIC DEVICE

[75] Inventor: Dong-Hwan Kim, Suwon, Rep. of Korea

[73] Assignee: SamSung Electronics Co., Ltd., Suwon, Rep. of Korea

[21] Appl. No.: 922,561

[22] Filed: Sep. 3, 1997

[30] Foreign Application Priority Data

Sep. 3, 1996 [KR] Rep. of Korea .................. 1996 38062

[51] Int. Cl.⁶ .................................................. H01M 10/46
[52] U.S. Cl. .......................................................... 320/118
[58] Field of Search .................................... 320/106, 110, 320/116, 118, 121, 132, 136, 105, 114, 115, 147, 148, DIG. 12; 307/66

[56] References Cited

U.S. PATENT DOCUMENTS

| | | |
|---|---|---|
| 5,179,337 | 1/1993 | Staarman et al. . |
| 5,355,071 | 10/1994 | Ishida et al. ............................ 320/110 |
| 5,359,318 | 10/1994 | Asai et al. . |
| 5,477,123 | 12/1995 | Allen et al. . |
| 5,477,124 | 12/1995 | Tamai . |
| 5,485,073 | 1/1996 | Kasashima et al. ..................... 320/106 |
| 5,547,775 | 8/1996 | Eguchi et al. . |
| 5,553,294 | 9/1996 | Nanno et al. . |
| 5,598,041 | 1/1997 | Willis . |
| 5,621,301 | 4/1997 | Allen et al. . |
| 5,629,602 | 5/1997 | Makino ...................................... 307/66 |
| 5,646,503 | 7/1997 | Stockstad . |
| 5,652,499 | 7/1997 | Morita et al. . |

*Primary Examiner*—Edward H. Tso
*Attorney, Agent, or Firm*—Robert E. Bushnell, Esq.

[57] ABSTRACT

A battery selection circuit for dual battery packs discharges the batteries in a stable way without regard to voltage differences. Also, if one of the batteries is installed, the battery is effectively selected to prolong battery life. When this circuit is adopted in a notebook computer, battery usage time is substantially increased. The battery selection circuit includes a battery detector for sensing the existence of the first and second battery packs and for producing the detect signals corresponding thereto. These detect signals are provided to a microcontroller to produce first and second battery discharge enable signals. In response to the first and second battery discharge enable signals, first and second electronic switches respectively connect each power supply line from the first and second batteries to a power supply circuit of the device. Reverse current blocking diodes are provided in series with the first and second switches, and a low resistive current path circuit is provided in parallel with the reverse current blocking diodes. The first switch and second switch as well as the low resistive current path circuit may include MOS FET transistors. Advantageously, a control circuit including logic gates is provided for opening the low resistive current path circuit when both the first and second batteries are detected, and for closing the corresponding low resistive current path circuit when one of the first and second batteries is detected.

8 Claims, 3 Drawing Sheets

SELECTION CIRCUIT FOR DUAL BATTERIES IN A BATTERY POWERED ELECTRONIC DEVICE

CLAIM OF PRIORITY

This application makes reference to, incorporates the same herein, and claims all benefits accruing under 35 U.S.C. §119 from an application for *A SELECTION CIRCUIT FOR DUAL BATTERIES IN A PORTABLE COMPUTER* earlier filed in the Korean Industrial Property Office on the 3$^{rd}$ of Sep. 1996 and there duly assigned Serial No. 38062/1996.

BACKGROUND OF THE INVENTION

1. Field of the Invention

The present invention relates to battery selection circuits for dual batteries used in battery powered electronic devices.

2. Description of the Related Art

Recently, portable or notebook computers have become a popular alternative to traditional desktop computers. These portable computers are typically powered by rechargeable batteries or alternatively by a power adapter which can be connected to an AC outlet. Often, it is desirable to operate the portable computers for lengthy periods of time in environments where AC power is unavailable. An earlier power supply system used in the portable computer includes a rechargeable battery and an AC adapter connected to a power supply circuit of a notebook computer, for example. The power supply circuit includes a reverse current blocking circuit having diodes and a DC-DC converter for receiving DC output voltages from the battery and the AC adapter, and for producing required DC output voltages to be supplied to electronic circuits.

In such a portable computer, the battery is usually formed into a pack including a plurality of battery cells and can be housed in a detachable way. Furthermore, only one battery pack is accommodated for the sake of mobility and convenience. Although the battery pack is composed of a longer-life battery, e.g., Nickel metal hydride (NiMH) or Lithium ion (Li-ion) electrolytes, the limited battery life can be a severe constraint on the effective portable use of a device.

One known way to extend battery life is to carry extra charged batteries. When AC power is not available, and when the battery expires, it can be replaced with another freshly charged one. However, this method can be inconvenient in swapping the batteries, and when the battery is changed, it may require powering off the device which causes a suspension of works proceeding in the computer.

In order to solve this problem, an effort has been made to install multiple battery packs in the portable computer to extend battery life. For example, an extra charged battery can be inserted into the portable computer so that 3.5" floppy disk drive is replaced by the extra battery. This method is based on the fact that the floppy disk drive is hardly used during the execution of word processing programs, for example. Of course, the package of the extra battery must have the same footprint as the floppy disk drive. Thus, a floppy disk drive receiving space of the portable computer can be used by an extra battery pack to increase total battery capacity.

However, in this case, problems arise when the characteristics of two battery packs are different. For example, differences in number of cells and voltages per cell between two battery packs results in a difference of output voltage level. Therefore, the discharging of two batteries is performed at the higher voltage level, that will be substantially ineffective for extending battery life. Further, the battery of a higher voltage level is liable to be discharged excessively and thus this will affect battery life by itself.

The patent to Eguchi et al, U.S. Pat. No. 5,547,775 entitled *Circuit For Preventing overcharge And Overdischarge Of Secondary Batteries*, discloses a circuit for preventing overcharge and overdischarge of two secondary batteries.

The patent to Stockstad, U.S. Pat. No. 5,646,503 entitled *Method For Balancing Power Sources And Structure Therefor*, discloses a method of balancing the discharge from two battery cells.

The following patents each disclose features in common with the present invention but are not as pertinent as the two patents discussed in detail above: U.S. Patent No. The Staarman et al, U.S. Pat. No. 5,179,337 entitled *Over-Discharge Protection For Rechargeable Batteries*, the Morita et al patent, U.S. Pat. No. 5,652,499 entitled *Power Supply Apparatus To Provide Power To Electrical Equipment From A Plurality Of Battery Packs And Its Method Of Power Supply*, the Tamai patent, U.S. Pat. No. 5,477,124 entitled *Circuit To Prevent Excessive Rechargeable Battery Discharge*, the Willis patent, U.S. Pat. No. 5,598,041 entitled *Efficient Fault Tolerant Switching Circuit For Redundant D.C. Power Supplies*, the Allen et al. patent, U.S. Pat. No. 5,477,123 to Allen et al, entitled *Connection Multiple Batteries To Battery Powered Devices*, the Nanno et al. patent, U.S. Pat. No. 5,553,294 entitled *Portable Computer Powered By Rechargeable Batteries*, and the Allen et al. patent, U.S. Pat. No. 5,621,301 entitled *Connecting Multiple Batteries To Battery Powered Devices*.

SUMMARY OF THE INVENTION

It is therefore an object of the invention to provide a battery selection circuit for battery powered electronic circuits having two battery packs in which discharging of batteries is effectively performed and battery usage time is substantially increased.

It is another object of the present invention to provide a battery selection circuit which can prevent overdischarging of a battery pack in dual battery powered electronic circuits.

In accordance with principle of the present invention, the above objects are achieved by a battery selection circuit for an electronic device which comprises: a first battery source; a second battery source; a battery detector for sensing the existence of the first and second battery sources and for producing detect signals corresponding thereto; a microcontroller for producing first and second battery discharge enable signals in response to first and second battery detect signals output from the battery detector; a first and second switch means for respectively connecting each power supply line from the first and second battery sources to a power supply circuit of the device in response to the first and second battery discharge enable signals; a cut off means for blocking reverse currents in the power supply lines and provided in series with the first and second switch means; a current path means for providing low resistive current paths and which is in parallel with the cut off means; a control means for opening the current path means when both the first and second battery sources are detected and for closing the corresponding low resistive current path when one of the first and second battery sources is detected.

In the preferred embodiment described below, the battery detector includes a pair of voltage divider resistors connected to a positive terminal of the first and second battery sources. Thus, the battery detector senses output voltages of the first and second battery sources, and when the detected output voltages are below a preset voltage level, the microcontroller permits the corresponding battery discharge enable signal to be deactivated.

Preferably, the first and second switch means include MOS FET transistors which turn on in response to a predetermined voltage level of the first and second battery discharge enable signals, and the cut off means includes a diode.

Further, the current path control means comprises a digital gate circuit having two inputs supplied with the first and second battery discharge enable signals and two outputs connected to each of the low resistive current path means at the first and second battery power supply lines, and, in response to the same logical input signals, producing at the two outputs the same inverted logical output signals, and, in response to the different levels of logical input signals, producing the same logical output signals as those of the input signals. Also, the low resistive current path means includes MOS FET transistors.

According to the battery selection circuit of this invention, overdischarging of a battery pack as well as shortening of the battery life due to the overdischarging can be effectively prevented. Furthermore, according to the charging state of multiple batteries, selection is made of one battery pack, thereby maximizing the operating time of a battery powered portable computer.

BRIEF DESCRIPTION OF THE DRAWINGS

This invention may be understood and its objects, features, and advantages will become apparent to those skilled in the art by reference to the accompanying drawings as follows.

DETAILED DESCRIPTION OF PREFERRED EMBODIMENTS

Figure 1:
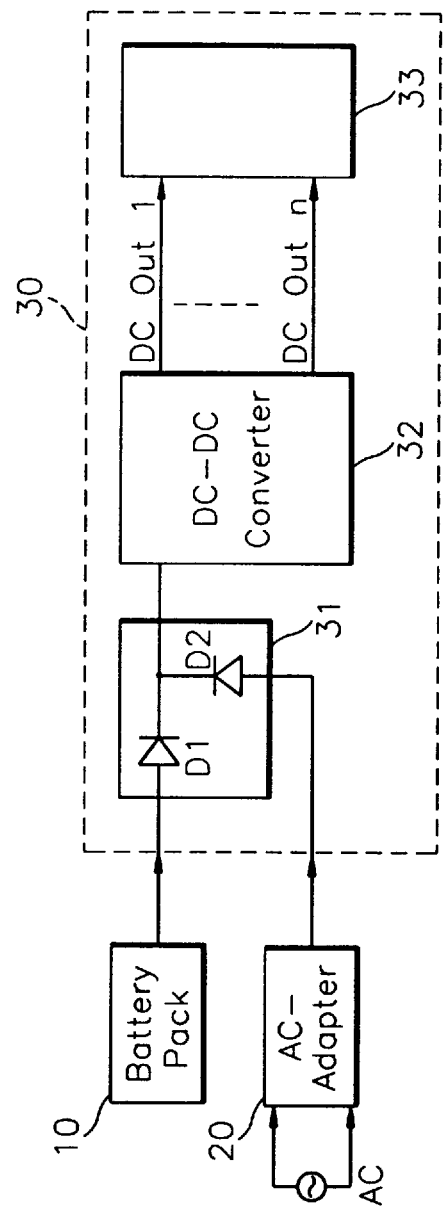
FIG. 1 is a diagram depicting an earlier power supply system used in a portable computer.

FIG. 1 illustrates an earlier power supply system used in a portable computer as discussed in the Description of the Related Art above. The system utilizes are chargeable battery 10 and an AC adaptor 20 which are connected to a power supply circuit 30 of a notebook computer. The power supply circuit 30 includes a reverse current blocking circuit 31 having diodes D1 and D2 and a DC-DC converter 32 for receiving the DC output voltages from the battery 10 and the AC adapter 20 and for producing required DC output voltages $DC_{out}1DC_{out}n$ to be supplied to electronic circuits 33.

Figure 2:
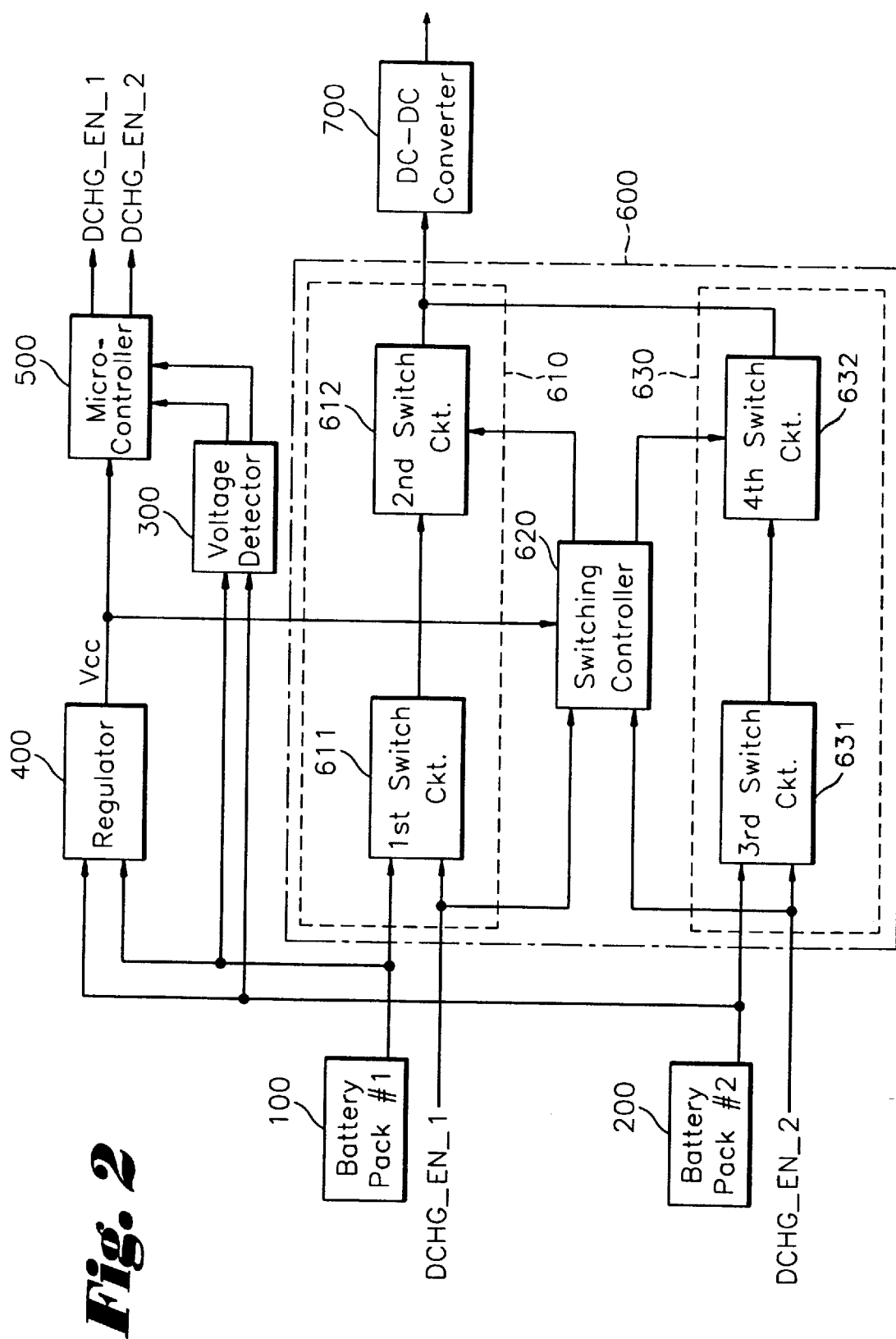
FIG. 2 is a block diagram depicting a battery selection circuit in accordance with the present invention.

Referring to FIG. 2, there is shown a battery selection circuit in accordance with the present invention. A first battery 100 and a second battery 200 are coupled to a battery selection circuit 600 which constitutes a part of a power supply circuit of a notebook computer, for example. The power supply circuit also includes a DC-DC converter 700 and smart battery circuitry which will be described hereinafter.

The batteries 100 and 200 are formed into a pack having a plurality of battery cells and may be respectively housed in the battery insertion compartment and the floppy disk drive insertion compartment of the notebook computer, for example. Also, the two battery packs 100 and 200 can be either the same type of battery or different types of battery, for example, a NiMI battery and/or a Li-ion battery. In this connection, notebook computers usually adopt so-called "smart battery" circuitry in order to prevent the above-mentioned batteries from being damaging by improper charging. The smart battery circuitry includes a microcontroller having the sole function of monitoring the performance of the battery and regulating both the charging and discharging of the battery to achieve optimum performance. This smart battery circuitry continually communicates with the device or charger connected to the battery to achieve these goals.

This smart battery circuitry is incorporated herein and as shown in FIG. 2, a microcontroller 500, a voltage detector 300, and a voltage regulator 400 constitute a part of the smart battery circuitry.

The battery selection circuit 600 of the present invention comprises first to fourth switch circuits 611, 612, 631, and 632, and a switching controller 620. The output terminals of the first and second battery packs 100 and 200 are connected to inputs of the first and third switch circuits 611 and 631 of the battery selection circuit 600, and to inputs of the voltage regulator 400 and the voltage detector 300. The output of the battery selection circuit 600 is connected to an input of the DC-DC converter 700. The DC-DC converter 700 receives an output voltage from the battery packs 100 or 200 through the first to fourth switch circuits 611, 612, 631, and 632, and produces required DC output voltages to be supplied to electronic circuits.

Figure 3:
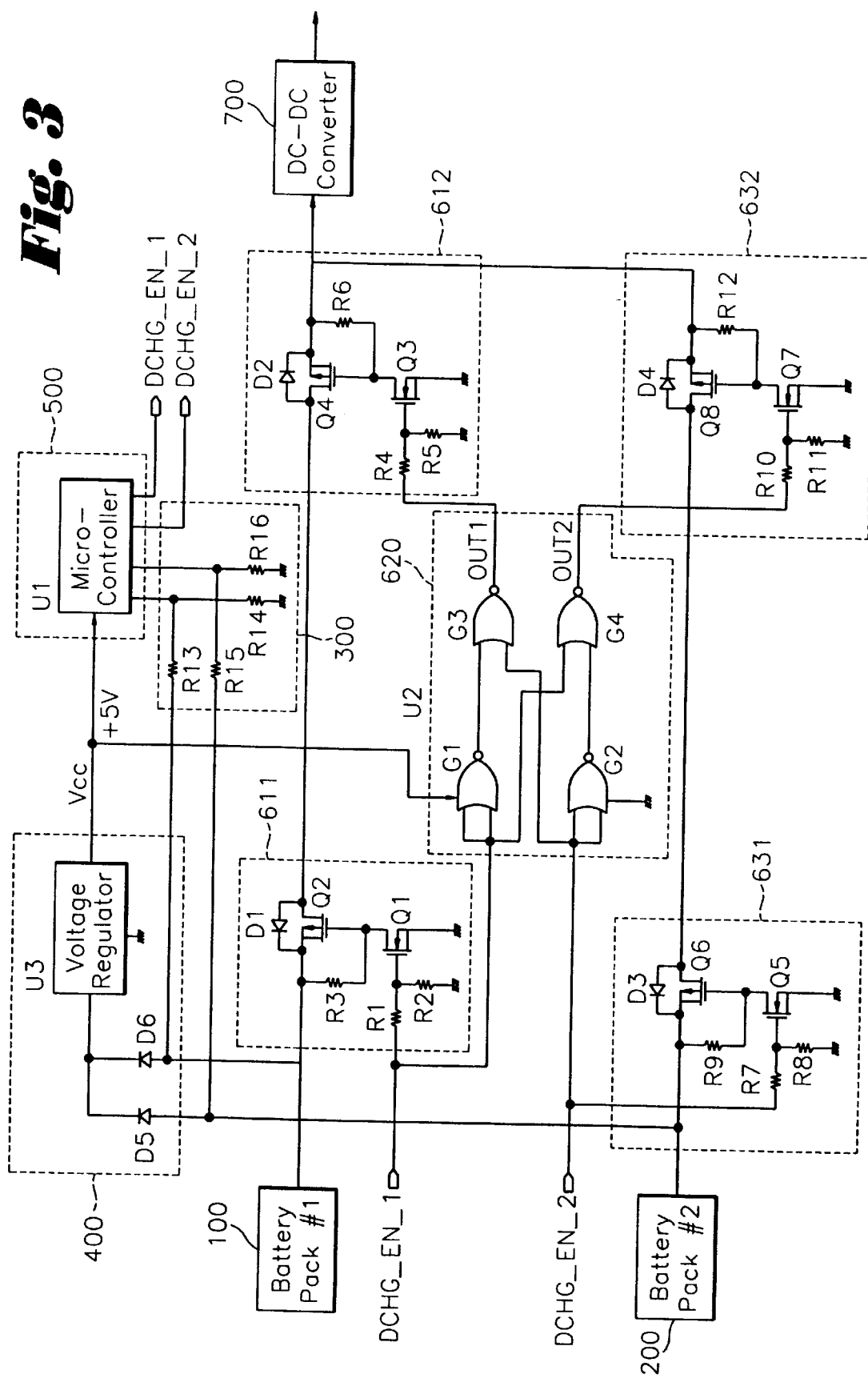
FIG. 3 is a detailed schematic diagram of the battery selection circuit shown in FIG. 2.

The voltage detector 300 of the smart battery circuitry detects output voltage levels of the first and second battery packs 100 and 200 and the voltage level signals are inputted to the microcontroller 500. For example, as shown in FIG. 3, the voltage detector 300 consists of a pair of voltage dividing resistor pairs R13 and R14 and R15 and R16. In the smart battery circuitry, the microcontroller 500 determines the existence of the first and second battery as well as charging/discharging status of the batteries from the detected voltage level. The detected voltage levels are compared with the preset voltage level stored in the microcontroller 500. If the detected voltage levels are higher than the preset voltage level, the microcontroller 500 produces at its output terminals discharge enable signals DCHG_EN_1 and DCHG_EN_2 related to the first and second battery packs 100 and 200. Meanwhile, the voltage regulator 400 regulates the output voltages from the first and/or second battery packs 100 and 200 to produce an operating voltage Vcc for the microcontroller 500 and the switching controller 620 of the battery selection circuit 600.

Referring to FIG. 3, a detailed circuit diagram of the battery selection circuit 600 is shown. The first switch circuit 611 and the third switch circuit 631 have two inputs, one of each being connected to a positive output terminal of the battery packs 100 and 200, and the other of each for respectively receiving the discharge enable signals DCHG_EN_1 and DCHG_EN_2.

The first switch circuit 611 consists of two MOS transistors Q1 and Q2 and related biasing resistors R1~R3 for switching on/off the power supply line from the battery pack 100 to the DC-DC converter 700, in response to a particular logical level of the discharge enable signals DCHG_EN_1 fed from the microcontroller 500. Also, the third switch circuit 631 has the same configuration as the first switch circuit 611, comprising two MOS transistors Q5 and Q6 and the related biasing resistors R7~R9. The transistors Q5 and Q6 switch on/off the power supply line of the second battery pack 200 in response to the discharge enable signal DCHG_EN_2. The discharge enable signals DCHG_EN_1 and DCHG_EN_2 have a logic high (1) voltage level when two battery packs 100 and 200 are installed and have a proper discharging voltage level. The discharge enable signals DCHG_EN_1 and DCHG_EN_2 allow the transistors Q1 and Q5 to be turned on and therefore the transistors Q2 and Q6 to be turned on.

Further, the discharge enable signals DCHG_EN_1 and DCHG_EN_2 are also supplied to two inputs of the switching controller 620 which includes four NOR gates G1~G4. As shown in FIG. 3, the input of the NOR gates G1 and G2 are connected with the discharge enable signal input terminals DCHG_EN_1 and DCHG_EN_2 and commonly connected to one input of NOR gates G4 and G3, respectively. Also, the output of the NOR gates G1 and G2 are connected to the other input of the NOR gates G3 and G4.

The output of the NOR gates G3 and G4 are connected to the switching signal input of the second switch circuit 612 and the fourth switch circuit 632, respectively. Similarly, the second switch circuit 612 and the fourth switch circuit 632 comprise two MOS transistor switches Q3 and Q4 and Q7 and Q8 and the related biasing resistors R4~R6 and R10~R12, and have the same configuration as those of the first switch circuit 611 and the third switch circuit 631, except for providing reverse current blocking diodes D2 and D4 disposed between the drain and source terminals of the MOS transistors Q4 and Q8 connected to the first and the third switch circuits 611 and 631 along the power supply line, respectively.

In operation, when two battery packs 100 and 200 are connected to the battery selection circuit 600, the microcontroller 500 detects the voltage level of each battery pack from the voltage detector 300. If the detected voltage level is higher than the preset level and the charging/discharging level of the battery is determined to be proper to operate, the microcontroller 500 produces logic high discharge enable signals DCHG_EN_1 and DCHG_EN_2. The discharge enable signals DCHG_EN_1 and DCHG_EN_2 are supplied to the switching signal input of the first and third switch circuits 611 and 631, and to the input of the switching controller 620. Therefore, the transistors Q1 and Q2 of the first switch circuit 611 and the transistors Q5 and Q6 of the third switch circuit 631 are turned on, and this will connect the power supply lines from the first and second battery packs 100 and 200 to the DC-DC converter 700 through the diodes D2 and D4, respectively.

Meanwhile, the logic high of the discharge enable signals DCHG_EN_1 and DCHG_EN_2 supplied to the input of the switching controller 620 are output at the output thereof OUT1 and OUT2 as logic low level signals. These low level signals are supplied to the control signal input of the switch circuits 612 and 632, which will turn off the transistors Q4 and Q8, and subsequently Q3 and Q7, respectively. However, as mentioned before, by provision of the diodes D2 and D4 between the drain and source terminals of the MOS transistors Q4 and Q8, each of the power supply lines from two battery packs 100 and 200 can be connected to the DC-DC converter 700.

Further, in this case, when voltages appear at the output of the switch circuits 612 and 632, i.e., the voltages of two power supply lines each from the first battery pack 100 and the second battery pack 200 have a difference, the diodes D2 and D4 prevent the reverse current that flows from higher voltage power supply line to the lower voltage line. Thus, power supplied from the two batteries to an electronic circuit such as the DC-DC converter 700 can be achieved in parallel in a stable way.

If one of the battery packs 100 and 200 enter the over-discharging state during the discharging operation, the microcontroller 500 recognize its state by sensing the voltage signals from the voltage detector 300, and then permits the discharge enable signal DCHG_EN_1 or DCHG_EN_2 related to the overdischarging battery pack to become deactivated. For example, if the first battery pack 100 enters the overdischarging state, the discharge enable signal DCHG_EN_1 supplied from the microcontroller 500 falls to a logic low level. This deactivated discharge enable signal DCHG_EN_1 will turn off the switch circuit 611, and therefore the power supply line from the first battery pack 100 is cut off. In this manner, overdischarging of the first battery pack as well as the second battery pack is effectively prevented.

Furthermore, if only one of the battery packs 100 or 200 is installed, the microcontroller 500 recognizes its connecting state by sensing the voltage signals from the voltage detector 300, and then produces one of the high level discharge enable signals DCHG_EN_1 or DCHG_EN_2 related to the connected battery pack. The discharge enable signal related to the disconnected battery pack is deactivated.

When one of the high level discharge enable signals (DCHG_EN_1 or DCHG_EN_2) related to the connected battery pack is supplied to the corresponding input of the switch circuit (611 or 631) and to one input of the switching controller 620, the switch circuit (611 or 631) as well as another switch circuit (612 or 632) placed along one of the power supply lines will be turned on, because the switching controller 620 outputs a logic high level signal to be supplied to the control signal input of the other switch circuit (612 or 632) related to the connected battery pack. For example, if battery pack 100 is connected to the circuit, a high level discharge enable signal DCHG_EN_1 is supplied to the control signal input of the switch circuit 611 and to one input of the switching controller 620. Therefore, the transistors Q1 and Q2 of the first switch circuit 611 are turned on, and the transistors Q3 and Q4 of the second switch circuit 612 placed along the power supply line of the first battery will be turned on because the switching controller 620 outputs logic high level signal at the output of the NOR gate G3, which is supplied to the gate of the transistor Q3 of the second switch circuit 612.

In this situation, since the transistors Q2 of the first switch 611 and Q4 of the second switch 612 are turned on, the current supplied from the battery pack 100 flows through the transistors Q2 and Q4, rather than the diode D2 parallel connected to the transistor Q4. This means that as the transistors Q2 and Q4 comprise MOS FET transistors, the transistor Q4 constitutes a low resistive current path compared with the diode path. Thus, power dissipation through the selected power supply line including the transistors Q2 and Q4 becomes extremely low. In this manner, one of the battery sources is effectively selected to supply DC power to the electronic circuit.

As apparent from foregoing, the battery selection circuit 600 as provided in the subject invention concept provides for a stable discharge operation of the dual battery sources. Further, battery life can be prolonged by preventing excessive discharging of one battery source and by minimization of power dissipation in the selection circuit. Further advantage is, according to the arrangement of the invention, mixed use of different type of batteries, e.g., Ni-MH and Li-ion batteries, is possible, which maximizes versatility for an overall battery powered electronic device.

While the invention has been described in terms of an exemplary embodiment, it is contemplated that it may be practiced as outlined above with modifications within the spirit and scope of the appended claims.

What is claimed is:

1. A battery selection circuit in a dual battery powered electronic device, comprising:

a first battery source;

a second battery source;

a battery detector for sensing the existence of the first and second battery sources and for producing detect signals corresponding thereto;

a microcontroller for producing a first and second battery discharge enable signals in response to first and second battery detect signals output from the battery detector;

first and second switch means for connecting each power supply line from the first and second battery sources to a power supply circuit of the device in response to the first and second battery discharge enable signals;

a cut off means for blocking reverse currents in the power supply lines and provided in series with the first and second switch means;

a current path means for providing low resistive current paths, the current path means being in parallel with the cut off means;

a control means for opening the low resistive current paths when the first and second battery sources are detected by the battery detector and for closing the corresponding low resistive current path when one of the first and second battery sources is detected by the battery detector.

2. A battery selection circuit of claim 1, the battery detector comprising a voltage detector for sensing output voltages of the first and second battery sources, the microcontroller causing the corresponding battery discharge enable signal to be deactivated when the detected output voltages are below a preset voltage level.

3. A battery selection circuit of claim 2, the voltage detector comprising a pair of voltage divider resistor pairs respectively connected to the positive terminals of the first and second battery sources.

4. A battery selection circuit of claim 1, the first and second switch means comprising MOS FET transistors, the transistors being turned on in response to a particular voltage level of the first and second battery discharge enable signals.

5. A battery selection circuit of claim 1, the cut off means comprising a diode.

6. A battery selection circuit in a dual battery powered electronic device, comprising:

a first battery source;

a second battery source;

a battery detector for sensing the existence of the first and second battery sources and for producing detect signals corresponding thereto;

a microcontroller for producing a first and second battery discharge enable signals in response to first and second battery detect signals output from the battery detector;

first and second switch means for connecting each power supply line from the first and second battery sources to a power supply circuit of the device in response to the first and second battery discharge enable signals;

a cut off means for blocking reverse currents in the power supply lines and provided in series with the first and second switch means;

a current path means for providing low resistive current paths, the current path means being in parallel with the cut off means; and a control means for opening the low resistive current paths when the first and second battery sources are detected by the battery detector and for closing the corresponding low resistive current path when one of the first and second battery sources is detected by the battery detector;

the control means comprising a digital gate circuit having two inputs supplied with the first and second battery discharge enable signals and two outputs connected to each of the low resistive current paths at the first and second battery power supply lines, the gate circuit producing, in response to the same logical input signals, the same inverted logical output signals at the two outputs, and, producing in response to different levels of logical input signals, the same logical output signals as those of the input signals.

7. A battery selection circuit of claim 1, the current path means comprising MOS FET transistors.

8. A battery selection circuit of claim 6, the current path means comprising MOS FET transistors.

* * * * *